US009785603B2

(12) United States Patent
Rivers et al.

(10) Patent No.: US 9,785,603 B2
(45) Date of Patent: *Oct. 10, 2017

(54) DEVICES, SYSTEMS, AND METHODS OF REDUCING CHIP SELECT

(71) Applicant: Micron Technology, Inc., Boise, ID (US)

(72) Inventors: Doyle Rivers, Meridian, ID (US); Paul D. Ruby, Folsom, CA (US); Anand S. Ramalingam, Portland, OR (US); Rajesh Sundaram, Folsom, CA (US); Julie M. Walker, El Durado Hills, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,902

(22) Filed: Jul. 18, 2016

(65) Prior Publication Data

US 2016/0328353 A1 Nov. 10, 2016

Related U.S. Application Data

(63) Continuation of application No. 13/961,377, filed on Aug. 7, 2013, now Pat. No. 9,477,616.

(51) Int. Cl.
*G06F 13/00* (2006.01)
*G06F 13/42* (2006.01)
(Continued)

(52) U.S. Cl.
CPC .......... *G06F 13/4247* (2013.01); *G06F 13/14* (2013.01); *G06F 13/385* (2013.01)

(58) Field of Classification Search
CPC .................................................... G06F 13/14
See application file for complete search history.

(56) References Cited

U.S. PATENT DOCUMENTS 5,956,349 A * 9/1999 Watanabe .............. G11C 29/14
714/718
6,708,242 B1 3/2004 Monia et al.
(Continued)

FOREIGN PATENT DOCUMENTS

| CN | 1713381 A | 12/2005 |
|----|-----------|---------|
| JP | 2002370383 A | 12/2002 |
| JP | 2006040261 A | 2/2006 |

OTHER PUBLICATIONS

"International Application Serial No. PCT/US2014/049965, International Search Report mailed Nov. 19, 2014", 6 pgs.
(Continued)

*Primary Examiner* — Zachary K Huson
(74) *Attorney, Agent, or Firm* — Schwegman Lundberg & Woessner, P.A.

(57) ABSTRACT

Several systems and methods of chip select are described. In one such method, a device maintains two identifiers, (ID_a and ID_m). When the device receives a command, it examines the values of ID_a and ID_m relative to a third reference identifier (ID_s). If either ID_a or ID_m is equivalent to ID_s, the device executes the command, otherwise, the device ignores the command. By using two different identification methods, a system has options in choosing to activate devices, being able to selectively switch between selecting multiple devices and single devices in a quick manner. In another such method, a device may have a persistent area that stores identification information such as an ID_a. Thus, system functionality may remain independent from any defect/marginality associated with the physical or logical components required for initial ID_a assignment of all devices in the system.

20 Claims, 4 Drawing Sheets

(51) Int. Cl.
  *G06F 13/14* (2006.01)
  *G06F 13/38* (2006.01)

(56) References Cited

U.S. PATENT DOCUMENTS

| | | | |
|---|---|---|---|
| 7,032,054 | B1 | 4/2006 | Mcginnis et al. |
| 8,223,523 | B2 | 7/2012 | Jin et al. |
| 8,259,484 | B2 | 9/2012 | Hung et al. |
| 8,271,738 | B2 | 9/2012 | Fields et al. |
| 8,463,948 | B1 | 6/2013 | Qawami et al. |
| 9,477,616 | B2 * | 10/2016 | Rivers .................. G06F 13/14 |
| 2002/0016893 | A1 | 2/2002 | Asauchi |
| 2005/0289269 | A1 | 12/2005 | Nakayama et al. |
| 2006/0200598 | A1 | 9/2006 | Janzen |
| 2008/0034005 | A1* | 2/2008 | Satoyama ............ G06F 3/0617 |
| 2010/0268853 | A1 | 10/2010 | Oh et al. |
| 2011/0085404 | A1 | 4/2011 | Yoko |
| 2012/0159025 | A1 | 6/2012 | Tailliet |
| 2012/0254472 | A1 | 10/2012 | Ware et al. |
| 2013/0007332 | A1 | 1/2013 | Teh et al. |
| 2013/0148448 | A1 | 6/2013 | Matsui |
| 2015/0046611 | A1 | 2/2015 | Rivers et al. |

OTHER PUBLICATIONS

"International Application Serial No. PCT/US2014/049965, Written Opinion mailed Nov. 19, 2014", 7 pgs.

"European Application Serial No. 14835228.9, Extended European Search Report dated May 31, 2017", 8 pgs.

"European Application Serial No. 14835228.9, Noting a Loss of Rights pursuant to Rule 112(1) EPC mailed Nov. 4, 2016", 2 pgs.

"Japanese Application Serial No. 2016-533405, Office Action dated Jan. 24, 2017", W/ partial English Translation, 10 pgs.

"Chinese Application Serial No. 201480054058.2, Office Action dated May 26, 2017", With English Translation, 8 pgs.

* cited by examiner

DEVICES, SYSTEMS, AND METHODS OF REDUCING CHIP SELECT

PRIORITY APPLICATION

This application is a continuation of U.S. application Ser. No. 13/961,377, filed Aug. 7, 2013, which is incorporated herein by reference in its entirety.

BACKGROUND

Apparatus such as computers and other electronic products (e.g., digital televisions, digital cameras, cellular phones, tablets, gaming devices, e-readers, and the like) often have memory devices with memory cells to store information. Oftentimes, such apparatuses have multiple memory devices.

DETAILED DESCRIPTION

In a system with multiple devices, such as a memory system with multiple dies, a Chip Select (CS#) reduction method enables a system to save board space by sharing CS#, Command/Address bus (CA bus), and/or a data bus across more than one device.

Several terms are to be defined first. ID_a is an assigned identifier (id) value held by the device as set by an AssignID command. An ID_a is selected once upon initialization and is not changed until the device is initialized again. An ID_s (or select identifier) is used to select which device is to be used to perform a command.

In accordance with a CS# reduction method, in order for a system to indicate which device(s) it wishes to target for operation among those on the shared signaling, it must first configure an ID_a value for each device in the system following a power cycle. Then to enable a device(s) response to subsequent command(s), it will issue a SelectID command such that ID_s is equal to the ID_a of the targeted device(s). The ID_a assignment sequence is dependent on the presence of a SIN/SOUT (Select Input and Select Output) daisy chain between all devices in the system as shown in FIG. 1.

Figure 1:
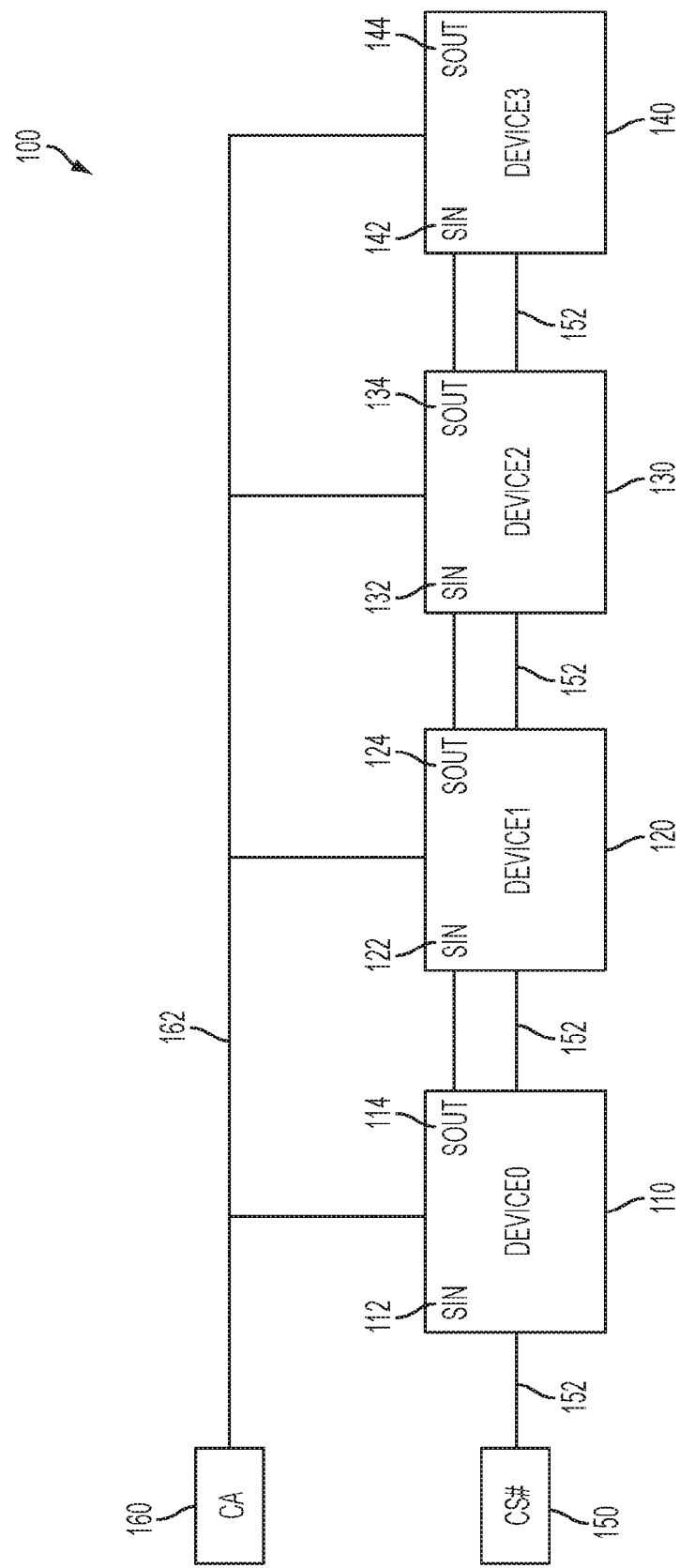
FIG. 1 is a block diagram of an embodiment of a system that contains selectable devices.

FIG. 1 shows system 100 comprising devices 110, 120, 130, and 140. Device 110 has an SIN 112 and an SOUT 114. Device 120 has an SIN 122 and an SOUT 124. Device 130 has an SIN 132 and an SOUT 134. Device 140 has an SIN 142 and an SOUT 144. Devices 110, 120, 130, and 140 are daisy chained to each other in that SOUT 114 is coupled to SIN 122, SOUT 124 is coupled to SIN 132, and SOUT 134 is coupled to SIN 142. It should be understood that each of devices 110, 120, 130, and 140 may have other inputs not illustrated in FIG. 1. For example, the devices may have a chip select input and a command/address input in addition to SIN and SOUT.

Upon the initialization of system 100, SIN 112 is internally pulled high while SOUT 114, SOUT 124, SOUT 134, and SOUT 144 are all internally driven to a low level. Once device 110 has its ID_a set as part of the initialization process, it will drive SOUT 114 high to enable the next device in the chain (device 120) to accept an AssignID command to set its ID_a. This continues for each of devices 120, 130, and 140. It should be understood that while four devices 110, 120, 130, and 140 are shown in FIG. 1, this process can be expanded to include more devices. Upon initialization, the first device in the chain (e.g., device 110 of FIG. 1) will have its SIN internally pulled high and all devices will have SOUT internally driven low. A device will only accept the AssignID command when its SIN is high. Once a device has its id set, it will drive its SOUT high to enable the next device in the chain (e.g., device 120 of FIG. 1) to accept the AssignID command. SOUT may also be left to FLOAT after the id is set. In this manner, the pull-up on the SIN pulls the line to a high logic level. It should be understood that the polarity and actual implementation of this daisy-chain logic is relative to this example. The polarity levels can be reversed such that a low logic level enables the device, in other implementations.

With continued reference to FIG. 1, Chip Select (CS#) 150 and Command/Address bus (CA) 160 are also present. CS# 150 is coupled to device 110 via CS line 152, which is in turn coupled to each of devices 120, 130, and 140 via CS line 152. Command/Address bus 160 is coupled to each of devices 110, 120, 130, and 140 via CA line 162.

After setting the ID_a for each device, to enable a device(s) response to subsequent command(s), a system will issue the SelectID command such that ID_s is equal to the ID_a of the targeted device(s). Thereafter, the system selects which device is to perform a command through use of the ID_s. When commands need to be issued for another device, another SelectID command will be issued. A flowchart illustrating such a process is provided as FIG. 2.

An incoming command is analyzed (202). If the incoming command is a SelectID command (204), then the ID_s variable is updated to the value specified in the command being analyzed (206). Thereafter, control continues with the next command (202).

If the incoming command is not a SelectID command, then the devices maintain the ID_s as set by the last SelectID command. If the ID_s is equal to the ID_a, then the command is executed (210), e.g., the operation is performed. Otherwise the command is ignored, because it is intended for another device in the system (212). Thereafter, the flow continues with the next command to be analyzed (202).

Figure 2:
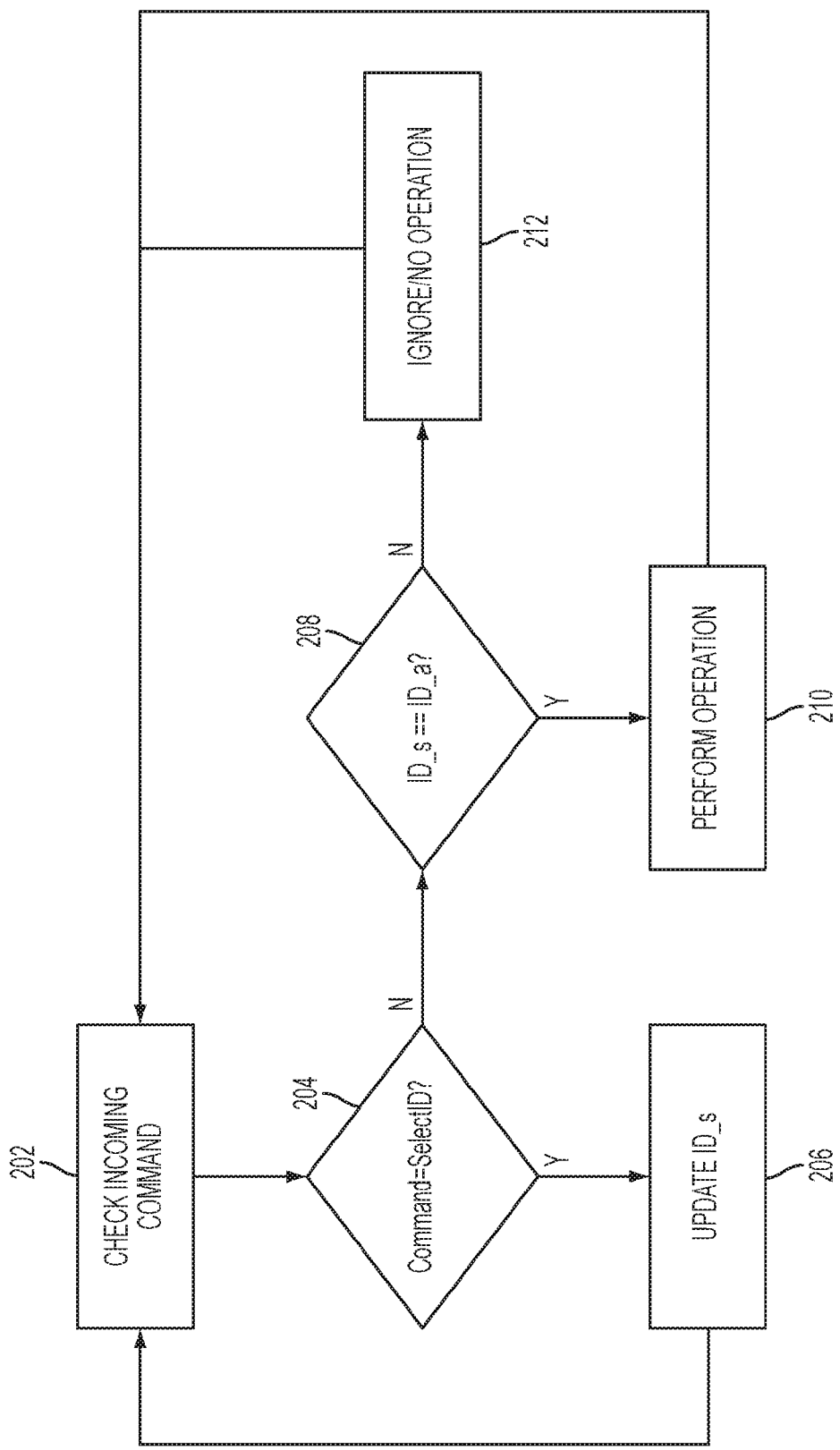
FIG. 2 is a flowchart illustrating an embodiment of an example method to select a device to perform an operation.

Each device in the system performs the method outlined in FIG. 2. Therefore, each command will eventually be executed by a device with an ID_a equal to the ID_s of the command.

Across the shared signaling, more than one device may share the same ID_a value if a system desires parallelism. In other words, by setting the ID_a of each of devices 110, 120, 130, and 140 to the same value, a command will be processed by each of devices 110, 120, 130, and 140. In one alternative, each device may have a unique ID_a if a system desires access to each individual device. In another alternative, partial parallelism may be obtained by setting the same ID_a of each device in the group of devices intended to perform the command, while setting the ID_a of other devices to a different value.

Once the ID_a is set via the AssignID command, subsequent AssignID commands are ignored and it cannot be changed without a power cycle and/or id scheme reassignment sequence.

A problem may arise in the case where the daisy chain of SIN/SOUT connections within a system or across devices in a system is broken due to a defect or performance marginality. A failure which prevents or delays a device from having its intended ID_a set may prevent every other device behind it in the daisy chain from receiving its intended ID_a. With reference to FIG. 1, if device 120 fails, then devices 130 and 140 will not be able to receive the AssignID command. Redundancy schemes of parity/XOR and spare devices cannot address this issue. The unsuccessful assignment of each ID_a throughout the system will cause the incorrect number of devices to respond to system operation and can result in unacceptable data loss or even total system failure in some circumstances.

A method is presented by which the risk of unacceptable data loss and/or total system failure due to any break in the SIN/SOUT daisy chain may be contained within the system manufacturing environment.

In this scheme, the value of ID_a for each device is stored to a persistent area within the device and within the system manufacturing environment. Persistent areas may include, but are not limited to: poly-fuses, metal fuses, memory array cells, non-volatile memory, and the like. In one embodiment, a persistent area is a fuse or set of fuses that store the ID_a.

Upon subsequent device initializations, logic will check if the value for its ID_a should be loaded from a persistent area stored within the device or not. If values stored within the persistent area are available, as would be the case upon exit from the system manufacturing environment, the ID_a value is set according to the persistent identifier stored in the persistent area. Thus, ID_a assignment is now independent of the SIN/SOUT daisy chain.

Figure 3:
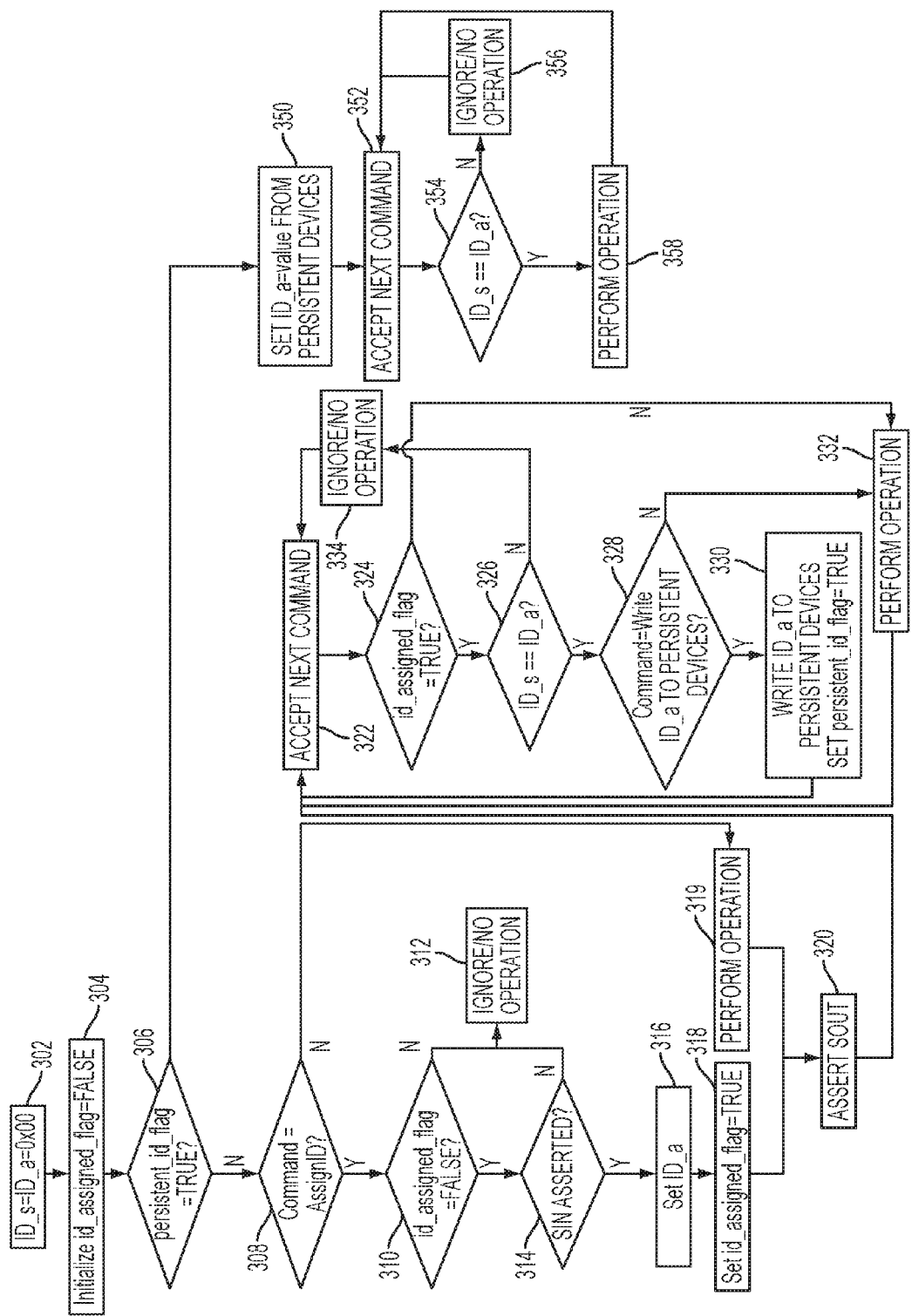
FIG. 3 is a flowchart illustrating an embodiment of an example method to set a device identification.

With reference to FIG. 3, a flowchart illustrating the logic used to set ID_a is shown. Upon initialization, ID_s and ID_a are set to 0x00 (302). It should be understood that this value is just for purposes of this example only. Other values of ID_s and ID_a may also be used. In this example, 0x00 serves as a known default value. Thereafter, a flag named id_assigned_flag is set to FALSE (304). Then the device is checked to determine if a flag persistent_id_flag is TRUE. Persistent_id_flag is a flag that indicates whether or not the device in question has a value that has already been stored in the persistent area. If the persistent id has already been set, then ID_a is set to the value contained in the persistent area (350). The next command is accepted (352). Thereafter, ID_s is checked to determined if it is equal to ID_a (354). If not, no action is taken (356) and the next command is worked on (352). If ID_s is equal to ID_a, then the command is intended for the device and the operation is performed (358).

If the persistent_id_flag has not been set, then the first command has to be analyzed to determine if the command is intended to set the ID_a of the device (308). If so, id assigned flag is then checked to determine if it is FALSE in combination with SIN=Asserted. If both conditions are met, then ID_a is set for the device (316), the id_assigned_flag is set to TRUE (318), and SOUT is set high (320). If either condition is not met, the command is ignored.

If the first command was not intended to set the ID_a of the device, the operation is performed (319) and SOUT is set high (320) such that all subsequent commands are performed without deference to the state of ID_s relative to ID_a (i.e., CS# reduction method is not used).

After the SOUT is asserted, the next command is accepted (322). If id_assigned_flag is TRUE, then ID_s is checked to see if it is equal to ID_a (i.e., is the command intended for this particular device) (326). If not, then no operation is taken (334) and the next command is accepted (322). Otherwise, the command is intended for the device. The command is checked to see if it is intended to write ID_a to the persistent area (328). It should be understood that the diagram depicts a single command for ease of illustration. The decision to write the ID_a to persistent area may be a single command or a series of commands. If not, then the operation is performed (332) and then the next command is accepted (322).

If the command is intended to write ID_a to the persistent area, then ID_a is written to the persistent area and the persistent_id_flag is set to TRUE (330). Thereafter, the next command is accepted (322). Otherwise, the operation is performed (332) and then the next command is accepted (322).

Pursuant to the limitations of the persistent areas that are used to store the persistent values (e.g., loaded from values as programmed to poly-fuses, metal fuses, memory array cells, etc.), these can be configured and reconfigured at any time during the lifetime of the device.

Even in the case of a failure or marginality of the SIN/SOUT connection, system failure is avoided because each die has a valid ID_a.

Another problem may also exist. As described above, upon initialization, the first device in the chain (e.g., device 110 from FIG. 1) will have its SIN internally pulled high and all devices will have SOUT internally driven low. A device will only accept the AssignID command when its SIN is high. Once a device has its id set, it will drive its SOUT high to enable the next die in chain (e.g., device 120) to accept the AssignID command.

Once all devices have their ids set, devices react to subsequent system commands only if the ID_s of the command is ==ID_a. Once the id is set via the AssignID command, subsequent AssignID commands are ignored and it cannot be changed without a power cycle.

A problem arises in the case where the system is required to toggle between two or more ID_a schemes, but without incurring a power cycle in between or requiring additional SelectID commands. Expected instances where avoidance of a power cycle and/or additional SelectID commands would be required include, but are not limited to:

1) When a system has configured its ID_a scheme for parallel operation, but wishes to "mask" or isolate one or more devices on the shared signaling from any level of use. This may occur, for example, in cases where a system incorporates a spare/redundant device. In such an instance, the system may wish to mask the spare/redundant device from unnecessary operation(s) (e.g., for energy savings, etc.). With reference to FIG. 1, a system may have each of device 110, 120, and 130 operating, but, for certain commands, device 140 would not be operating.

2) When a system has configured its ID_a scheme such that there is both individual die access and parallel die access. In other words, there is more than one ID_a on the shared signaling (e.g., for individual die access), but then desires the performance of a parallel response for common and/or time-critical command sequences (e.g., power down entry, mode register write, etc.). This allows a system to avoid managing the overhead of iterating through the sequence of issuing a SelectID+command for each ID_a on the shared signaling.

One method by which this is possible is to create a second device identifier that all devices respond to, regardless of their current ID_a value. This identifier may be referred to as "ID_m" and is defined as follows:

ID_m="master" id value held by the device, overrides ID_a

The ID_m value can be passed to the device by incorporating it into the existing SelectID command format, by creating a new command, or via any defined sequence of signal(s). The logic by which to enable or disable a device's response to receiving the ID_m value and the ID_m value itself can be either non-volatile values maintained by the device permanently or volatile values which can be managed by a system if desired (e.g., overwrite to entirely mask a device from operation until next power-cycle, etc.).

The example below describes one possible implementation and demonstrates how it can be used to resolve the problems previously outlined. In this example, there are four devices sharing a CS# and CA bus (e.g., devices 110, 120, 130, and 140 from FIG. 1).

Assume the value for ID_m is defined and incorporated into the existing SelectID command such that all devices will respond to subsequent command(s) when the ID_s is set to 0x3Fh.

Now, if a system configured for parallelism needs to "mask" or isolate one or more devices on the shared signaling from any level of use, it may configure its id scheme as follows. With continued reference to FIG. 1, assume that the system desires that device 130 be selectively masked from the rest of the devices. In such a situation, the ID_m of devices 110, 120, 130, and 140 are each set to the same value (for illustrative purposes, ID_m=0x3Fh). But only the ID_a of devices 110, 120, and 140 are set to the same value (for illustrative purposes, ID_a=0x00h). The ID_a of device 130 is set to a separate, unique value, not equal to the ID_a of devices 110, 120, and 130 (for illustrative purposes, ID_a of device 120=0x05h).

By setting the ID_a of device 130 to a unique value, the system can selectively mask device 130 from responding to commands by setting the ID_s of a command to 0x00h to exclude the device 130. When a command is set to 0x00h, only device 110, 120, and 140 would execute the command—device 130 will ignore it because device 130 does not respond to commands intended for 0x00h. By setting the ID_s of a command to a value of 0x3Fh (the value of ID_m), each of devices 110, 120, 130, and 140 will execute the command. Thus, the system can avoid the power cycles required to toggle between id configurations and avoid any overhead of issuing additional SelectID commands. The system can access all four of devices 110, 120, 130, and 140, or it can select devices 110, 120, and 140 in a parallel configuration to execute a command. The system can also access device 130 alone.

For systems configured with more than one ID_a, but that need selective parallel responses, it may configure its id scheme such that ID_m of each of devices 110, 120, 130, and 140 is the same value (for illustrative purposes: 0x3Fh) while the ID_a of each device is different (for illustrative purposes the ID_a of device 110 is 0x00h, the ID_a of device 120 is 0x01h, the ID_a of device 130 is 0x02h, and the ID_a of device 140 is 0x03h). In this configuration, a system may set ID_s with values of 0x00/01/02/03 for individual access to devices 110, 120, 130, or 140, respectively. The system can set the ID_s to a value of 0x3Fh when desiring a parallel response to command(s) such that each of devices 110, 120, 130, and 140 perform the command. By doing so, this system can avoid the power cycles normally required to toggle between id configurations and avoid any overhead of issuing additional SelectID commands.

Figure 4:
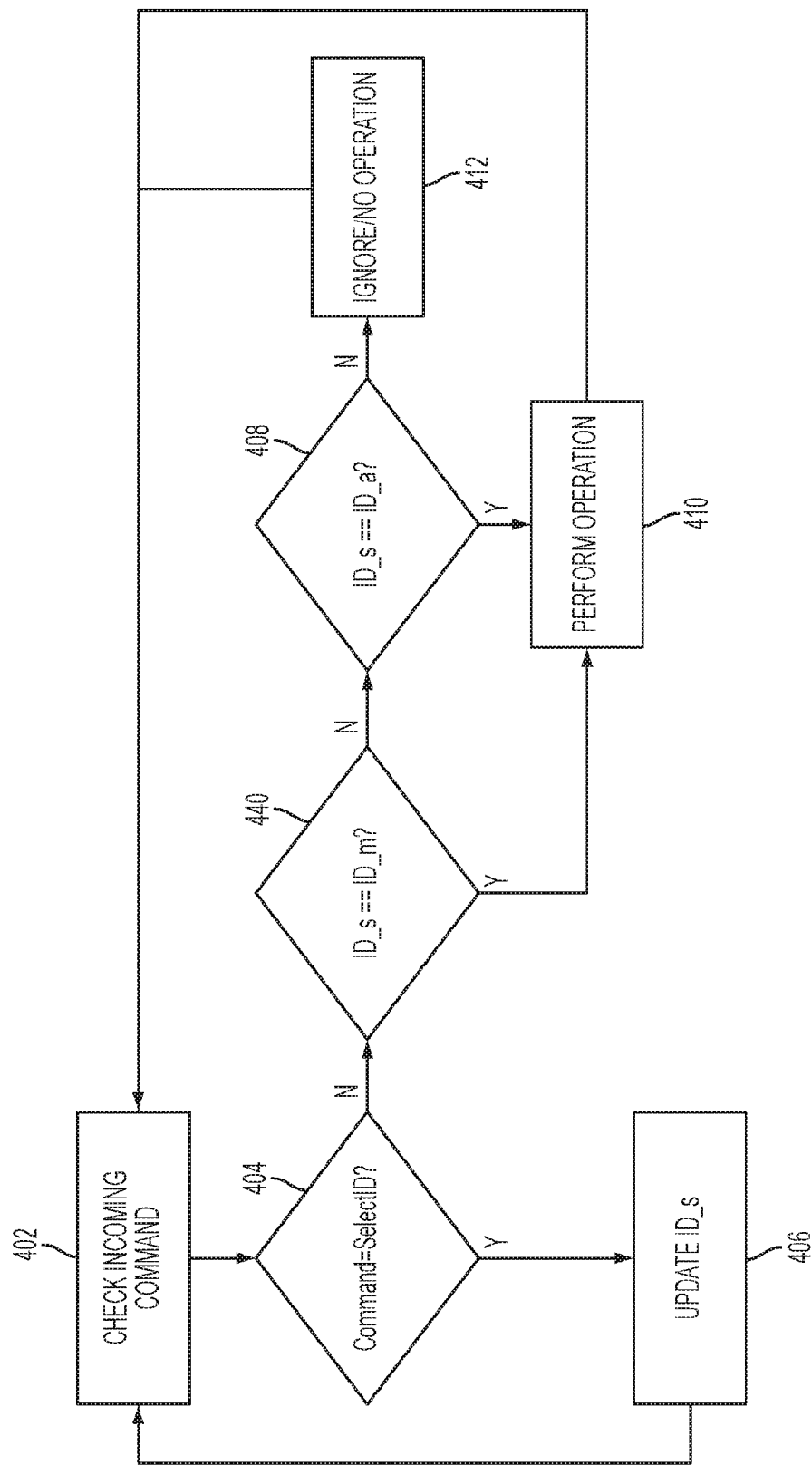
FIG. 4 is a flowchart illustrating an embodiment of an example method to select a device to perform an operation.

FIG. 4 presents a flowchart illustrating the operation of a device in a system that is using ID_m. A command is received (402). As an initial matter, the command is analyzed to see if the command is a SelectID command (404). These commands are intended to set the ID_s of the next series of commands until another SelectID command is received. If the command is intended to set the ID_s, the ID_s is updated (406), and the system prepares for the next command (402). Until another SelectID command is issued, the ID_s associated with any command remains ID_s.

If the command is not a SelectID command, the ID_s of the command is checked to see if it is equal to the ID_m of the device (440). If so, the device performs the operation. If not, the ID_s is checked to see if it is equal to the ID_a of the device (408). If so, the device performs the operation (410). If not, the command is not intended for the device and is ignored (412). Thereafter, the device processes the next command (402).

These illustrations of apparatus are intended to provide a general understanding of the structure of various embodiments and are not intended to provide a complete description of all the elements and features of apparatuses that might make use of the structures described herein.

Any of the components described above can be implemented in a number of ways, including simulation via software. Thus, the apparatus described above may all be characterized as "modules" (or "module") herein. Such modules may include or be included in hardware circuitry, single and/or multi-processor circuits, memory circuits, software program modules and objects and/or firmware, and combinations thereof, as desired by the architect of the apparatus and as appropriate for particular implementations of various embodiments. For example, such modules may be included in a system operation simulation package, such as a software electrical signal simulation package, a power usage and distribution simulation package, a capacitance-inductance simulation package, a power/heat dissipation simulation package, a signal transmission-reception simulation package, and/or a combination of software and hardware used to operate or simulate the operation of various potential embodiments.

The apparatus of various embodiments may include or be included in electronic circuitry used in high-speed computers, communication and signal processing circuitry, single or multi-processor modules, single or multiple embedded processors, multi-core processors, data switches, and application-specific modules including multilayer, multi-chip modules. Such apparatus may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3(Motion Picture Experts Group, Audio Layer 3) players), vehicles, medical devices (e.g., heart monitor, blood pressure monitor, etc.), set top boxes, and others.

Embodiments of methods and apparatus similar to or identical to the embodiments described above with reference to FIG. 1 through FIG. 4 include the following:

In one embodiment, a method for selecting devices within a system that contains a first device, a second device, and a third device is presented. The method comprises: assigning an identical master identifier to each device within the system; assigning a first assigned identifier to the first device; assigning a second assigned identifier to the second device; assigning a third assigned identifier to the third device; and selecting each of the first device, second device, and third device by setting a select identifier to a value equal to the master identifier.

In another embodiment, the method may further comprise: selecting only the first device by setting a select identifier to a value equal to the first assigned identifier; selecting only the second device by setting a select identifier to a value equal to the second assigned identifier; and selecting only the third device by setting a select identifier to a value equal to the third assigned identifier; wherein the first assigned identifier is not equal to the second assigned identifier; the first assigned identifier is not equal to the third assigned identifier; and the second assigned identifier is not equal to the third assigned identifier.

In another embodiment, the method may further comprise: selecting only the first device by setting a select identifier to a value equal to the first assigned identifier; and selecting both the second device and the third device by setting a select identifier to a value equal to the second assigned identifier; wherein the first assigned identifier is not equal to the second assigned identifier; the first assigned identifier is not equal to the third assigned identifier; and the second assigned identifier is equal to the third assigned identifier.

In another embodiment, each of the first, second, and third devices in the system are memory devices.

In one embodiment, a method for selecting devices within a system that contains a first device, a second device, and a third device is presented. The method comprises: assigning a first assigned identifier to the first device; assigning a second assigned identifier to the second device; assigning a third assigned identifier to the third device; wherein assigning the first assigned identifier to the first device comprises setting the first assigned identifier equal to a persistent identifier associated with the first device.

In another embodiment, the persistent identifier is stored in a persistent area of the device.

In another embodiment, assigning the second assigned identifier to the second device comprises setting the second assigned identifier equal to a second persistent identifier associated with the second device. The persistent identifier is stored in a persistent area of the second device.

In another embodiment, assigning the third assigned identifier to the third device comprises setting the third assigned identifier equal to a third persistent identifier associated with the third device; wherein the third persistent identifier is stored in a persistent area of the third device.

In one embodiment, a method of executing a command on a device within a multiple device system is presented. The method may comprise: receiving a command; updating a select identifier when the command is a SelectID command; determining if there is a persistent identifier associated with the device; setting the assigned identifier of the device from a persistent area within the device when there is a persistent ID associated with the device; determining if the command is intended for the device by comparing the select identifier (ID_s) to the assigned identifier (ID_a) of the device; ignoring the command when the command is not intended for the device; and performing the command when the command is intended for the device.

In another embodiment, the method may further comprise: determining if the command is intended to write a persistent identifier to the device; writing the persistent identifier to a persistent area of the device.

In another embodiment, the method may further comprise: determining if the command is intended to write a value to the assigned identifier of the device; determining if the assigned identifier has previously been set; determining if a select input (SIN) to the device is asserted; and writing the value to the assigned identifier to the device when each of the determining steps above are true.

In another embodiment, the method may further comprise: asserting a select output (SOUT) output of the device; wherein the SOUT of the device is coupled to an SIN of a second device.

In one embodiment, a system may comprise: a first device having a first master identifier and a first assigned identifier, the first device being capable of being accessed using either the first master identifier or the first assigned identifier; a second device having a second master identifier and a second assigned identifier, the second device being capable of being accessed using either the second master identifier or the second assigned identifier; and third device having a third master identifier and a third assigned identifier, the third device being capable of being accessed using either the third master identifier or the third assigned identifier. The system accesses one of the first, second, or third devices by setting a select identifier to one of the first master identifier, second master identifier, third master identifier, first assigned identifier, second assigned identifier, or third assigned identifier.

In another embodiment, the first master identifier, the second master identifier, and the third master identifier are each set to a first value; the first assigned identifier and the second assigned identifier are each set to a second value that is different from the first value; and the third assigned value is set to a third value that is different from the first and second values.

In another embodiment, the system is arranged to access each of the first, second, and third devices by setting the select identifier to the first value; the system is arranged to access the first and second devices by setting the select identifier to the second value; and the system is arranged to access the third device by setting the select identifier to the third value.

In another embodiment, the first master identifier, the second master identifier, and the third master identifier are each set to a first value; the first assigned identifier is set to a second value that is different from the first value; the second assigned identifier is set to a third value that is different from the first value and the second value; and the third assigned value is set to a fourth value that is different from the first value, second value, and third value.

In another embodiment, the system is arranged to access each of the first, second, and third devices by setting the select identifier to the first value; the system is arranged to access the first device by setting the select identifier to the second value; and the system is arranged to access the second device by setting the select identifier to the third value; and the system is arranged to access the third device by setting the select identifier to the fourth value.

In another embodiment, each of the first, second, and third devices are memory devices.

In one embodiment, a device may comprise: a chip select input; a command/address input; a select in (SIN) input; a select out (SOUT) output; and a persistent area. The persistent area is configured to contain a value for an assigned identifier.

In another embodiment, the device is arranged to set the assigned identifier from the persistent area.

In another embodiment, the device may further comprise a flag. The flag indicates if the device sets the assigned identifier from the persistent area or if an external entity sets the assigned identifier.

In another embodiment, the device is arranged to set an assigned identifier if the SIN is set to a high level.

In another embodiment, the device is arranged to receive an assigned identifier value via the command/address input.

In another embodiment, the SOUT is arranged to be coupled to the SIN of another device.

In another embodiment, the device is arranged to write a value to the persistent area.

In another embodiment, the persistent area is selected from one of the following: poly-fuses, metal fuses, memory array cells, and non-volatile memory.

The above description and the drawings illustrate some embodiments of the invention to enable those skilled in the art to practice the embodiments of the invention. Other embodiments may incorporate structural, logical, electrical, process, and other changes. Examples typify possible variations. Portions and features of some embodiments may be included in, or substituted for, those of others. Many other embodiments will be apparent to those of skill in the art upon reading and understanding the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A device comprising:
   a chip select input;
   a command/address input to receive a signal associated with execution of an operation by the device, when the device is identified as accessible, in conjunction with a chip select signal received at the chip select input; and
   a persistent area, the persistent area configured to contain a value for an assigned identifier and a value for a master identifier such that the device is accessible in response to a setting of a select identifier to the assigned identifier and the device is accessible in response to a setting of a select identifier to the master identifier.

2. The device of claim 1, wherein the device includes a select input and a select output to conduct an assignment sequence of the assigned identifier for the device.

3. The device of claim 2, wherein the device is operable to adjust levels at the select input and the select output to set an assigned identifier for a second device when coupled to the device in a daisy chain.

4. The device of claim 2, wherein the device is operable to receive the assigned identifier via the command/address input.

5. The device of claim 1, wherein the persistent area is one of poly-fuses, metal fuses, memory array cells, or non-volatile memory.

6. The device of claim 1, wherein the persistent area includes a location to store a persistent flag that is an indication as to whether or not the device has a value for an identification of the device stored in the persistent area.

7. A system comprising:
   a plurality of devices coupled together in a daisy chain, each device including:
   a chip select input;
   a command/address input to receive a signal associated with execution of an operation by the device, when the device is identified as accessible, in conjunction with a chip select signal received at the chip select input; and
   a persistent area, the persistent area configured to contain a value for an assigned identifier and a value for a master identifier such that the device is accessible in response to a setting of a select identifier to the assigned identifier and the device is accessible in response to a setting of a select identifier to the master identifier;
   a chip select line coupled to the chip select input of each device; and
   a command/address line coupled to the command/address input of each device.

8. The system of claim 7, wherein the system is operable to access selectively ones of the devices of the plurality based on values of the assigned identifiers of the devices.

9. The system of claim 8, wherein the selective access includes parallel operation of two or more devices of the plurality and less than all the devices of the plurality.

10. The system of claim 7, wherein each device has a select input and a select output, the devices arranged in the daisy chain with the select output of one device coupled to the select input of a next device in the daisy chain.

11. The system of claim 10, wherein each device is operable to adjust levels at its select input and its select output to set an assigned identifier for the next device in the daisy chain.

12. The system of claim 7, wherein each device is configured to maintain the assigned identifier once set until changed in a power cycle and/or an identification reassignment sequence.

13. The system of claim 7, wherein the plurality of devices includes a spare device configured to perform limited operations based on an operation of an identification scheme of the system on the assigned identifiers of the devices of the plurality.

14. The system of claim 7, wherein each device has an assigned identifier value stored within the persistent area of the respective device in a manufacturing environment.

15. The system of claim 7, wherein for each device of the plurality, the master identifier operatively overrides the assigned identifier.

16. A method comprising:
   receiving a command at a plurality of devices coupled together in a daisy chain, each device including:
   a chip select input coupled to a chip select line;
   a command/address input coupled to a command/address line to receive a signal associated with execution of an operation by the device, when the device is identified as accessible, in conjunction with a chip select signal received at the chip select input; and
   a persistent area, the persistent area configured to contain a value for an assigned identifier and a value for a master identifier such that the device is accessible in response to a setting of a select identifier to the assigned identifier and the device is accessible in response to a setting of a select identifier to the master identifier;
   determining, for each device of the plurality, if the command is intended for the respective device by comparing a select identifier of the command to the assigned identifier or the master identifier of the respective device; and performing the command when the command is determined to be intended for the respective device.

17. The method of claim 16, wherein the method includes conducting an assignment sequence to set the value for the assigned identifier for a selected device of the plurality of devices based on levels at a select input and at a select output for the device.

18. The method of claim 16, wherein the method includes setting the value for the assigned identifier device using an assign identification command via the command/address line.

19. The method of claim 16, wherein comparing the select identifier of the command to the assigned identifier or the master identifier of the respective device includes the master identifier of the respective device overriding the assigned identifier of the respective device.

20. The method of claim 19, wherein comparing the select identifier of the command to the assigned identifier or the master identifier of the respective device includes comparing the select identifier of the command to the master identifier of the respective device and refraining from comparing the select identifier to the assigned identifier of the respective device upon determination of the select identifier being equal to the master identifier.

* * * * *